Oct. 13, 1925.　　W. WORTHINGTON　　1,556,888
VEHICLE WHEEL
Filed March 21, 1922
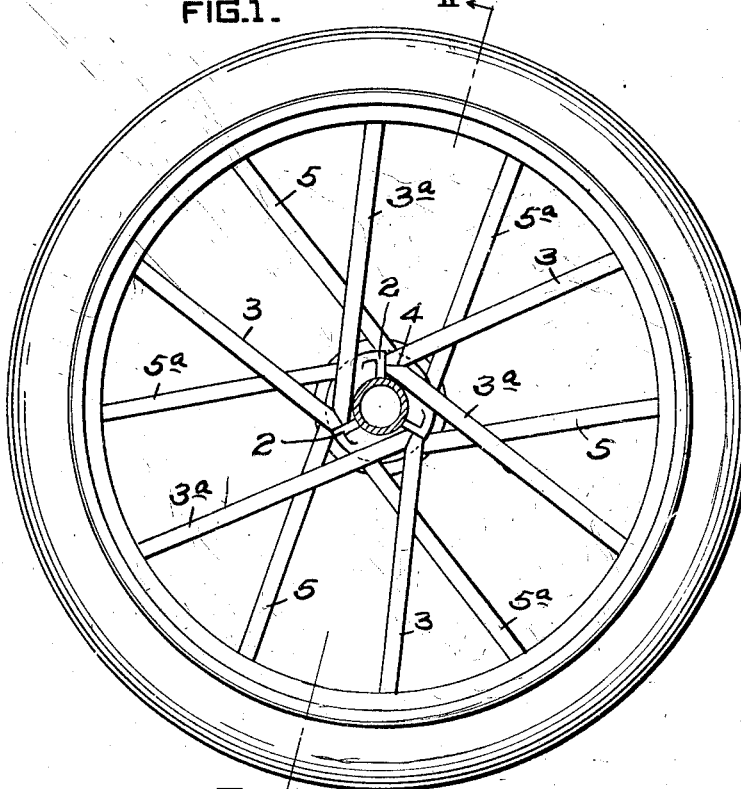
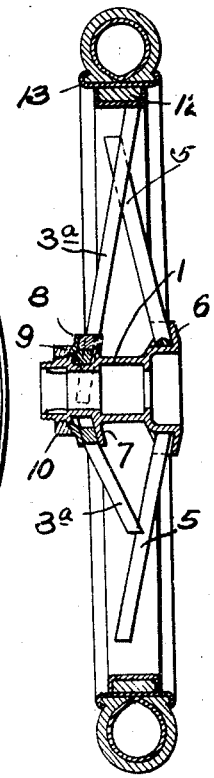
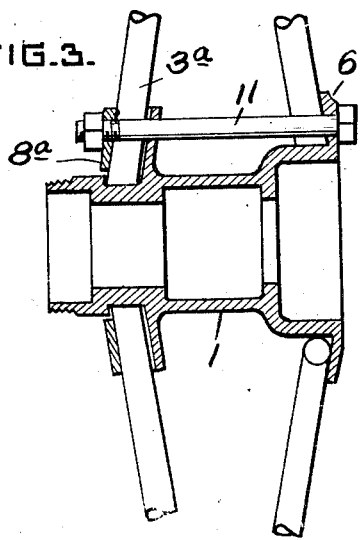
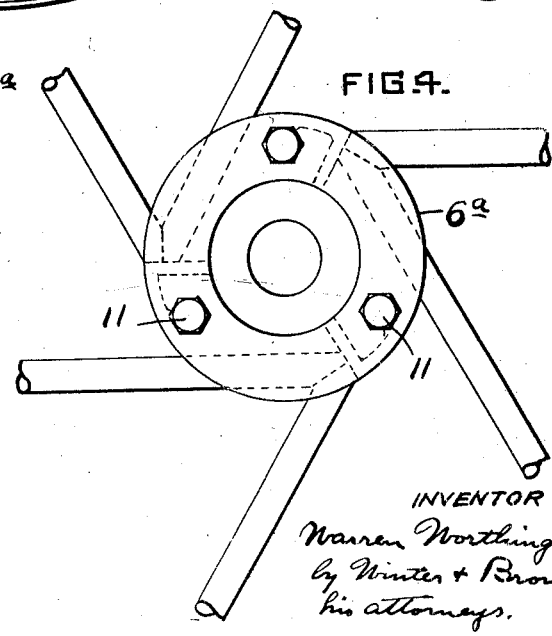
INVENTOR
Warren Worthington,
by Winter & Brown,
his attorneys.
WITNESSES
J. Herbert Bradley.

Patented Oct. 13, 1925.

1,556,888

UNITED STATES PATENT OFFICE.

WARREN WORTHINGTON, OF RUSHLAND, PENNSYLVANIA.

VEHICLE WHEEL.

Application filed March 21, 1922. Serial No. 545,400.

*To all whom it may concern:*

Be it known that I, WARREN WORTHINGTON, a citizen of the United States, and a resident of Rushland, in the county of Bucks and State of Pennsylvania, have invented a new and useful Improvement in Vehicle Wheels, of which the following is a specification.

The invention relates to vehicle wheels, and has particularly to do with wheels for power driven road vehicles, such as automobiles, trucks and the like.

An object of the invention is to provide a strong and durable vehicle wheel, which may be made out of simply constructed parts adapted to be easily assembled without the exercise of special skill on the part of workmen.

A further object is to provide a vehicle wheel having compression spokes so constructed and arranged with relation to the hub and felloe that the spokes will not be subject to bending strains regardless of how stresses may be applied to them by forces acting through the hub and felloe, and a wheel in which the strains in the spokes may be equalized.

The invention is illustrated in the accompanying drawings of which Fig. 1 is an elevation of the outside of the wheel; Fig. 2 a sectional view taken through the axis of the wheel, the plane of view being indicated by the line II—II, Fig. 1; Fig. 3 a view corresponding to the central portion of Fig. 2 illustrating a modification in a detail of construction; and Fig. 4 a side view of the right hand portion of the wheel illustrated in Fig. 3.

The wheel constructed according to this invention includes the usual wheel elements, namely a hub, felloe and spokes. The hub, as far as its interior form is concerned, may be constructed to fit any desired type of axle bearing, and the felloe may be constructed to receive any desired type of tires or rims for tires. The spokes extending between the hub and felloe are compression spokes having thrust bearings upon the hub, and are arranged in pairs in such a manner that the inner ends of the spokes forming a pair may so act upon and move each other on their hub thrust bearing that the stresses in the spokes may be substantially equalized. Furthermore, the spokes are preferably arranged in two series extending toward each other from or near the ends of the hubs in a manner to render the wheel strong and highly resistant against sidewise thrusts.

The invention may be fully understood and its advantages appreciated by reference to the illustrative embodiment of it. A hub 1, which may be an integral metal part or may be built up of several parts, is formed interiorly to fit a standard type of automobile axles. To receive and form thrust bearing faces for the ends of the spokes, each end of the hub may be provided with substantially radially extending flanges 2, the spoke-bearing faces of which preferably lie in planes substantially parallel with the axis of the wheel. Against the bearing face of each flange 2 on the outside of the wheel there are seated the ends of a pair of compression spokes 3 and 3ᵃ. These spokes, while they may be made of various materials and in various forms, are preferably metal tubes. That they may so act upon and move each other as to equalize the strains in them, the inner ends of each pair of spokes are cut on planes oblique to their axes at such angles that they meet in a plane substantially as indicated by the line 4. The other portions of the ends of the spokes of each pair are so cut that they slidably bear upon the face of a flange 2. The advantage of this manner of arranging and constructing the spokes and forming thrust bearings for their ends will be presently explained.

While the invention is unlimited to the number of spokes used in each wheel, there are preferably twelve spokes arranged in two series of six each extending toward each other from opposite ends of the hub. Each series being arranged in pairs in the manner explained, there are accordingly three equally spaced spoke-bearing faces formed on the flanges 2 at each end of the hub.

To form a lateral support for the series of inner spokes, the members of each pair of which are indicated by the numerals 5 and 5ᵃ, a flange 6 may be provided or arranged to extend laterally from the inner end of the hub. A similar flange 7 may, if desired, be arranged adjacent to the insides of the spokes 3 and 3ᵃ. To compensate for variations in the lengths of pairs of spokes, in a manner presently to be explained, a floating ring may be arranged to bear against the outer faces of one series of spokes. As shown in Fig. 2 a floating ring 8 may be provided with a spherical face 9 adjacent to its inner edge, and a nut 10 having a corresponding spherical face may engage threads on the hub and receive the spherical face of the floating ring. In the modification of construction illustrated in Figs. 3 and 4 a floating ring $8^a$ is held against the outer faces of the spokes 3 and $3^a$ by means of bolts 11 which extend through and engage the inner flange $6^a$ of the hub.

As shown in Fig. 2, the two series of spokes may, and preferably do, cross each other near their outer ends, and may be attached to a felloe 12 adapted to receive a tire rim 13. Various types of felloes and attachments of the spokes to them may be used.

In use each pair of spokes forms with the intervening felloe section a triangle in which the strains are distributed and equalized by reason of the movable thrust bearing of the spokes at their inner ends. For example, if it be assumed that the spoke 3 of a pair should be somewhat shorter than its required length, pressure on spoke $3^a$ would move the inner end of spoke 3 outwardly until both spokes would sustain substantially the same amount of strain. Because of this action of the spokes, it is unnecessary in their manufacture to exercise great skill in making them to precise lengths. In case both spokes of a pair should be somewhat shorter than the required lengths, compensation for this is made by the floating ring. For example, in case a pair of spokes 3 and $3^a$ are too short the felloe will move slightly out of alignment at the outer ends of the spokes, although not sufficient to cause a noticeable wabble in the wheel, and the floating ring will so adjust itself as to bear uniformly upon the outer faces of all the spokes in the series.

It is characteristic of the wheel constructed according to this invention that the spokes under no conditions of application of forces to them through the hub or felloe are subject to bending strains. If a lateral force should be applied to the felloe, say for example in a right hand direction to the bottom of the wheel as viewed in Fig. 2, this would be resisted solely by compression in the spokes 5 and $5^a$ extending from this portion of the felloe to the hub and by the spokes 3 and $3^a$ at the opposite side of the wheel. Similar stress conditions prevail in the spokes where corresponding lateral forces are applied through the hub. Therefore, the spokes need be constructed only of sufficient strength to resist compression.

Manifestly the wheel may be easily and cheaply manufactured, and after having been assembled requires no adjustment in use. It is light in weight, strong and durable, and may be used alike for a driven as well as merely a supporting wheel.

I claim:

1. A vehicle wheel comprising a hub, a felloe, and compression spokes extending tangentially from and having their inner ends movably bearing upon the hub, the spokes being arranged in pairs the inner ends of the elements of which act upon each other to form with the intervening felloe section strain-equalizing triangles.

2. A vehicle wheel comprising a hub, a felloe, and compression spokes arranged in two series extending toward each other from the ends of the hub, and the spokes of each series being arranged in pairs extending tangentially from and having their inner ends movably bearing upon the hub.

3. A vehicle wheel comprising a felloe, a hub having spoke-bearing faces extending substantially radially from and lying in planes substantially parallel with the axis of the wheel at each end of the hub, compression spokes arranged in two series extending toward each other from each end of the hub, the spokes in each series being arranged in pairs, the inner ends of the spokes forming each pair having movable thrust bearings upon one of said faces and capable of acting upon each other to equalize the strains in the pair of spokes.

4. A vehicle wheel comprising a hub having substantially radially extending spoke-bearing faces, a felloe, compression spokes arranged in two series extending toward each other from said spoke-bearing faces of the hub, the spokes of each series being arranged in pairs having thrust bearings upon and movable with relation to said faces, and a floating ring bearing against the sides of the spokes of one series adjacent to the hub to compensate for movements of the spokes with relation to the hub and for variations in the lengths of the spokes.

In testimony whereof, I sign my name.

WARREN WORTHINGTON.